United States Patent [19]

Schätzler et al.

[11] 4,272,124
[45] Jun. 9, 1981

[54] DEVICE FOR HEIGHT ADJUSTMENT OF A RIGID SLIDING COVER

[75] Inventors: Walter Schätzler, Aufhausen; Georg Kohlpaintner, Maisach, both of Fed. Rep. of Germany

[73] Assignee: Webasto-Werk W. Baier GmbH & Co., Stuttgart, Fed. Rep. of Germany

[21] Appl. No.: 74,543

[22] Filed: Sep. 11, 1979

[30] Foreign Application Priority Data

Sep. 16, 1978 [DE] Fed. Rep. of Germany ....... 2840443

[51] Int. Cl.³ ................................................ B60J 7/00
[52] U.S. Cl. ...................................... 296/222; 296/224
[58] Field of Search ............ 296/137 R, 137 B, 137 E, 296/137 F, 222, 224

[56] References Cited
U.S. PATENT DOCUMENTS 4,175,784  11/1979  Schatzler ......................... 296/137 E Primary Examiner—Randolph A. Reese
Assistant Examiner—John A. Carroll
Attorney, Agent, or Firm—Craig and Antonelli

[57] ABSTRACT

A sliding cover panel assembly for a motor vehicle roof that includes a cover panel that is slidably guided in tracks between positions opening and closing a roof opening via sliding shoes connected to the cover panel and having an adjustment mechanism for adjusting the height of the cover panel relative to the roof opening when the cover panel is in a position closing the roof opening. In a preferred embodiment, the height adjusting mechanism includes a lever that is mounted to the cover panel so as to be rotatable about an axis intermediate its ends, a locking arrangement associated with the lever securing the lever in any rotational position relative to the cover panel and a link arm having one end swivelably connected to an end of the lever and another end connected to a sliding shoe via a swivelable connection. By rotational adjustment of the lever of the height adjustment mechanism about its rotational axis, the height of the cover panel relative to the sliding shoe can be adjusted.

9 Claims, 4 Drawing Figures

DEVICE FOR HEIGHT ADJUSTMENT OF A RIGID SLIDING COVER

BACKGROUND AND SUMMARY OF THE INVENTION

The invention relates to a device for height adjustment of a rigid sliding cover of a vehicle roof, said cover being connected near its rear edge on each side with a sliding shoe or a sliding shoe support by means of a swivelable arm, said shoe or shoe support being guided in or on a track, said track being mounted along one side edge of a roof opening coverable by said cover.

The height adjustment of the sliding cover, which is required to ensure that the sliding cover is flush with the vehicle roof in the closed position, is generally accomplished by vertical displacement of the guide track. This requires loosening a plurality of mounting screws and adjusting adjustment screws, requiring considerable effort. It is also known to modify the distance between the pivot points of the arm, at which it is mounted at one end to the cover and at the other end to the sliding shoe or sliding shoe support, for the purpose of height adjustment of the sliding cover, by means of an adjustment screw, said screw being accessible from below. In order to permit this accessibility, the arm must be disposed on the inside of the guide track and therefore relatively far inside the roof opening. Consequently, the width of the roof opening is reduced, and, when a transparent sliding cover is used, it makes it necessary to cover the edge of said cover over a relatively wide area so that the arm is not visible from outside.

An object of the invention is to provide a device for height adjustment, said device being adjustable laterally from within the roof opening, occupying little space, and being mountable on the outside of the guide track, so that the roof opening has a considerable width and the covering edge required when a glass cover is used can be narrow.

This object is achieved according to a preferred embodiment of the invention by virtue of the fact that the arm is swivelably mounted at one end on the sliding shoe or sliding shoe support and at the other end on one end of a lever, said lever being mounted on the cover so that it rotates about an axis which is remote from the pivot point, and is lockable in any position relative to the cover. By rotating the lever, the sliding cover can be adjusted heightwise in a simple manner.

Preferably, the lever is mounted rotatably between its ends on a plate extending downward from the cover, and is fastenable at its other end to the plate by means of a bolt, said bolt passing through a curved slot in the plate.

To facilitate swiveling the lever by means of a screwdriver, a bolt can be welded to the lever to provide a rotatable bearing, said bolt being provided with an adjustment slot at the end which faces the roof opening. This bolt can be made in the form of a threaded bolt, and can be clampable by a nut against the plate in order to form a second fastening for the lever to the bolt.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
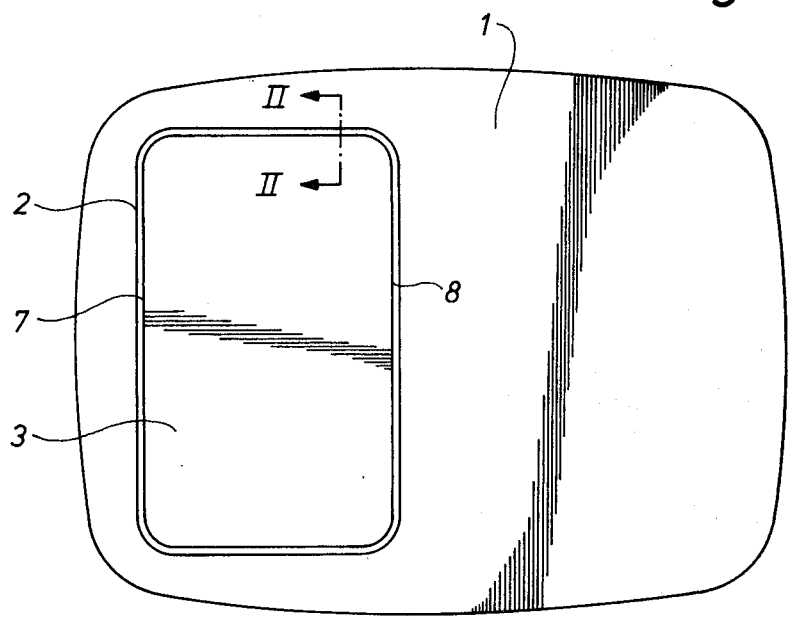
FIG. 1 is a top view of a vehicle roof.
Figure 2:
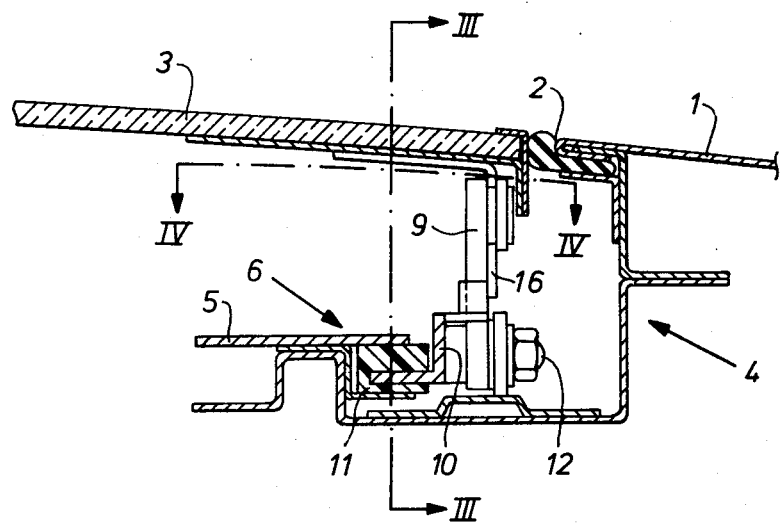
FIG. 2 is a cross-section along II—II in FIG. 1.

A rectangular roof opening 2 is provided in roof 1 of a motor vehicle, said opening being closable by a rigid sliding cover 3. Roof opening 2 is surrounded by a frame 4, said frame supporting a guide track 5 with a guide channel 6 along the lateral edges of roof opening 2. Sliding cover 3 is provided on each side with a sliding shoe (not shown) near its forward edge 7, said shoe being guided in guide channel 6. In addition, sliding cover 3 is connected near its rear edge 8 on both sides to a sliding shoe support 10 by a swivelable arm 9, said support supporting sliding shoes 11, which engage guide channel 6. One end of arm 9 is connected to sliding shoe support 10 by a pivot pin 12. A lever 14 is articulated at the other end of arm 9 by means of a pivot pin 13, said lever being mounted to a plate 16 in such manner that it is rotatable about an axis 15, said plate being fastened to sliding cover 3. A bolt 17 is provided to lock lever 14 against plate 16, said bolt passing through a curved slot 18 in plate 16 and clamping lever 14 to plate 16 by means of nut 17a. Pivot axis 15 of lever 14 is formed by a bolt welded in place, said bolt being provided with an adjustment slot 19 at the end facing roof opening. After loosening bolt 17, the height of sliding cover 3 can be adjusted by turning lever 14, by means of a screwdriver inserted in adjustment slot 19, until the cover is flush with vehicle roof 1 in the closed position. Then bolt 17 is retightened. To provide additional security, bolt 15 can be made in the form of a threaded bolt which clamps lever 14 additionally to plate 16 by means of a nut 15a.

Figure 3:
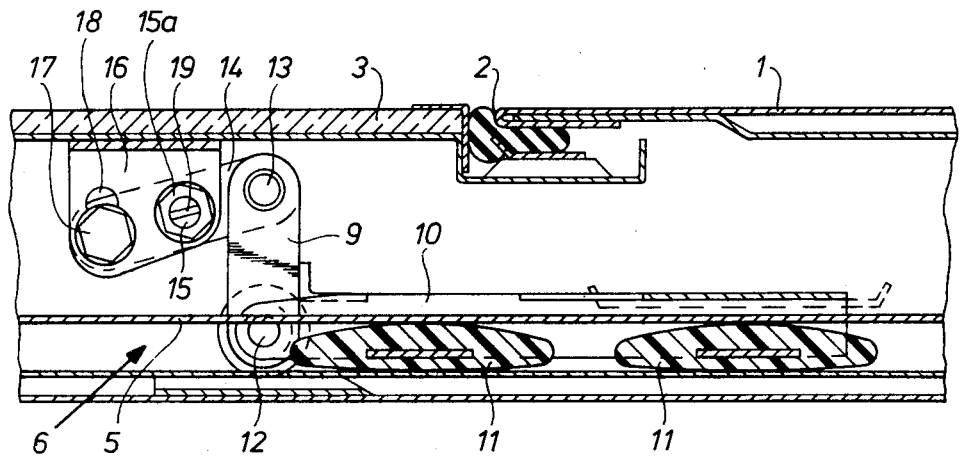
FIG. 3 is a cross-section along III—III in FIG. 2.
Figure 4:
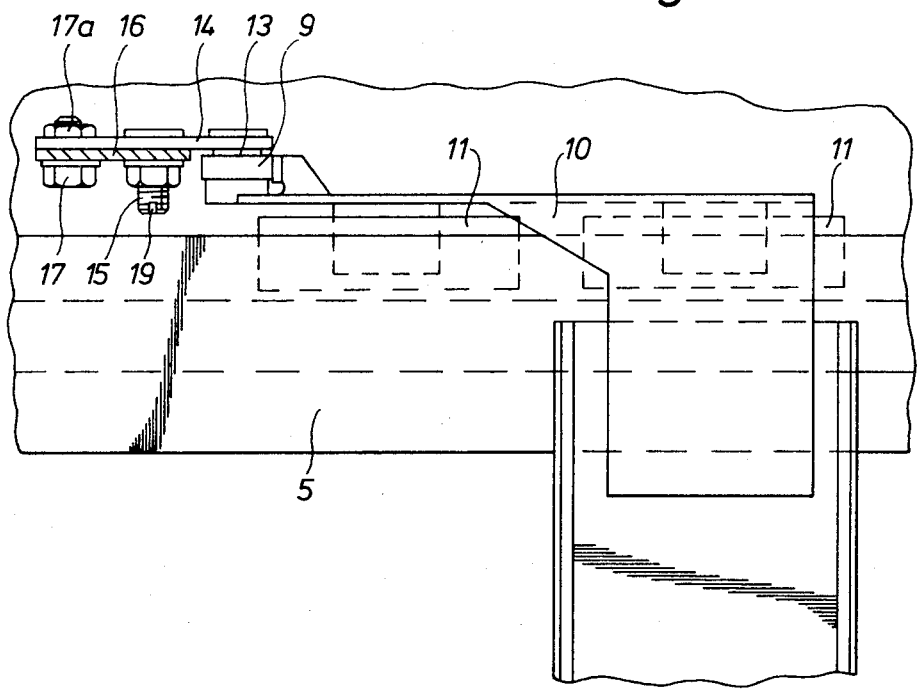
FIG. 4 is a cross-section along IV—IV in FIG. 2.

The normal downward movement of the rear end of the cover, which is required to slide sliding cover 3 beneath solid roof 1, is accomplished in the usual manner by means of arm 9, with sliding shoe support 10 being pulled rightward in FIG. 3 by an incompressible cable or the like. The resultant counterclockwise swiveling of arm 9 about pivot pin 12 causes the rear end of cover 8 to move downward. Conversely, when sliding shoe support 10 is displaced leftward in FIG. 3 after reaching the closed position, arm 9 swivels clockwise until it has reached the position shown in FIG. 3.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A rigid sliding cover panel assembly for a motor vehicle roof of the type having a cover panel that is slidable in guide tracks between positions opening and closing a roof opening via sliding shoes connected to said cover panel and having adjustment means for adjusting the height of said cover panel relative to said roof opening when said cover panel is in the position closing the roof opening, said height adjustment means comprising a lever mounted by a rotatable connector to said cover panel so as to be rotatable about an axis intermediate its ends, locking means associated with said lever for securing the lever in any rotation position relative to said cover panel, and a link arm having one end swivelably connected to an end of said lever and another end connected to a sliding shoe via a swivelable connection, whereby rotational adjustment of said lever about said axis will adjust the height of said cover panel relative to said sliding shoe.

2. A cover panel assembly according to claim 1, wherein the swivelable connection at the other end of said link arm is at a sliding shoe support connected with said sliding shoe.

3. A cover panel assembly according to claims 1 or 2, wherein the connection between the cover panel and the lever is located near a rear edge of the cover panel.

4. A cover panel assembly according to claim 1, wherein the axis is a rotatable connection between the lever and cover panel at a plate extending downward from the cover panel and said locking means is a bolt passing through the lever and a curved slot in the plate for locking said lever against the plate.

5. A cover panel assembly according to claim 4, wherein said axis is formed by a second bolt that is non-releasably mounted on the lever to provide a rotatable bearing for the latter, said second bolt being provided with an adjustment slot at an end of the second bolt facing a longitudinal center plane of said roof opening for facilitating turning of said lever about said axis.

6. A cover panel assembly according to claim 5, wherein the second bolt is a threaded bolt clampable against the plate by a nut.

7. A cover panel assembly according to claim 3, wherein the axis is a rotatable connection between the lever and cover panel at a plate extending downward from the cover panel and said locking means is a bolt passing through the lever, a curved slot in the plate for locking said lever against the plate.

8. A cover panel assembly according to claim 7, wherein said axis is formed by a second bolt that is non-releasably mounted on the lever to provide a rotatable bearing for the latter, said second bolt being provided with an adjustment slot at an end of the second bolt facing a longitudinal center plane of said roof opening for facilitating turning of said lever about said axis.

9. A cover panel assembly according to claim 8, wherein the second bolt is a threaded bolt clampable against the plate by a nut.

* * * * *